US011938721B2

(12) United States Patent
Johnson

(10) Patent No.: US 11,938,721 B2
(45) Date of Patent: Mar. 26, 2024

(54) LIQUID EJECTION HEAD AND METHOD OF TESTING FOR LEAKS IN LIQUID SUPPLY OPENINGS OF LIQUID EJECTION HEAD

(71) Applicant: CANON KABUSHIKI KAISHA, Tokyo (JP)

(72) Inventor: Michiko Johnson, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/726,395

(22) Filed: Apr. 21, 2022

(65) Prior Publication Data

US 2022/0348004 A1 Nov. 3, 2022

(30) Foreign Application Priority Data

Apr. 28, 2021 (JP) ................................ 2021-076731

(51) Int. Cl.
*B41J 2/045* (2006.01)
*B41J 2/14* (2006.01)
*B41J 2/175* (2006.01)

(52) U.S. Cl.
CPC ............ *B41J 2/0451* (2013.01); *B41J 2/175* (2013.01); *B41J 2002/14411* (2013.01)

(58) Field of Classification Search
CPC .................... B41J 2/17513; B41J 2/175; B41J 2002/14411; B41J 2/0451; B41J 2/14; B41J 2/1433
See application file for complete search history.

(56) References Cited

U.S. PATENT DOCUMENTS

2013/0027469 A1* 1/2013 Ishikawa .................. B41J 2/14 347/44

FOREIGN PATENT DOCUMENTS

JP 2008-074035 A 4/2008

* cited by examiner

*Primary Examiner* — Jannelle M Lebron
(74) *Attorney, Agent, or Firm* — Canon U.S.A., Inc. I.P. Division

(57) ABSTRACT

A liquid ejection head includes an ejection-port defining member and a substrate having at least three liquid supply openings arranged in an array direction. The substrate has at least one groove in a region between ends of the liquid supply openings and an edge of the substrate. The groove extends from and communicates with the end of at least one of two outermost liquid supply openings of the liquid supply openings in the array direction. The groove extends at least to a position where the groove is superposed on the liquid supply opening next to the liquid supply opening communicating with the groove in an extending direction in which the liquid supply openings extend.

7 Claims, 4 Drawing Sheets

LIQUID EJECTION HEAD AND METHOD OF TESTING FOR LEAKS IN LIQUID SUPPLY OPENINGS OF LIQUID EJECTION HEAD

BACKGROUND

Field of the Disclosure

The present disclosure generally relates to a liquid ejection head and more specifically relates to a method of testing for leaks in liquid supply openings of the liquid ejection head.

Description of the Related Art

A known printing apparatus includes a liquid ejection board that enables different kinds of liquid (different colors of ink) to be ejected from ejection ports. Such a liquid ejection board has a liquid supply opening, through which the liquid is supplied to the ejection ports, for each color. If any of the liquid supply openings arranged for the respective colors is leaking, the ink may flow into another liquid supply opening to cause color mixture, or alternatively, the ink may flow out of the liquid ejection board through a leak point.

Japanese Patent Laid-Open No. 2008-74035 describes a method of providing a test groove between two adjacent liquid supply openings to test the liquid supply openings for leaks. A constant pressure is applied to the test groove to measure a pressure fluctuation in the groove, thereby testing the two liquid supply openings for leaks. The test groove is provided between each liquid supply opening and the next liquid supply opening. All of the liquid supply openings can be tested for leaks in one test.

As described in Japanese Patent Laid-Open No. 2008-74035, the test groove is provided between each liquid supply opening and the next liquid supply opening. Smaller spacing between the liquid supply openings makes it difficult to form the groove between the liquid supply openings. It is therefore difficult to allow a small liquid ejection board to have a configuration described in Japanese Patent Laid-Open No. 2008-74035.

A method of testing liquid supply openings for leaks without using test grooves so that the liquid supply openings can be tested if the spacing between the openings is small will be described with reference to FIGS. 3A to 4C. FIG. 3A is a perspective view of a liquid ejection head 17. As illustrated in FIG. 3A, the liquid ejection head 17 includes a liquid ejection board 16 and a liquid supply member 15. The liquid ejection board 16 includes an ejection-port defining member 13 having ejection ports 1*b*, 2*b*, 3*b*, 4*b*, and 5*b*, through which liquid is ejected, and a substrate 14. The substrate 14 supports the ejection-port defining member 13. The liquid supply member 15 supplies the liquid to liquid supply openings 1 to 5 through inlet ports 1*a*, 2*a*, 3*a*, 4*a*, and 5*a* arranged in the substrate 14.

FIG. 3B is a transparent view of the liquid ejection board 16 in FIG. 3A as viewed from where the ejection ports are located.

FIG. 3C is a schematic view of the liquid ejection board 16 taken along line IIIC-IIIC in FIG. 3B. As illustrated in FIG. 3C, the liquid supply openings 1 to 5 communicate with the inlet ports 1*a* to 5*a* and the ejection ports 1*b* to 5*b*, respectively. The liquid supply openings 1 to 5 are provided for different colors of liquid to be ejected.

FIGS. 4A to 4C illustrate a method of testing the liquid supply openings 1 to 5 in FIGS. 3A to 3C for leaks. FIG. 4A is a schematic view of the liquid ejection board 16 connected to a leak testing device 11. FIG. 4B is a top view of the liquid ejection board 16 connected to the leak testing device 11 in FIG. 4A. FIG. 4C is a top view thereof illustrating leaks 100, 101, and 102. After completion of production of the liquid ejection head 17, the ejection ports 1*b* to 5*b* are closed by a sealing member 12. The leak testing device 11 is then connected to the inlet ports 1*a*, 3*a*, and 5*a* of the liquid supply openings 1, 3, and 5 to be tested for leaks, and compressed air (at 90 kPa, for example) is supplied to the liquid supply openings 1, 3, and 5. The liquid supply openings 2 and 4 not to be tested at this time are open to atmosphere.

After supply of the compressed air, a pressure fluctuation (of 3.0 Pa or more, for example) in the liquid supply openings 1, 3, and 5 is measured to determine the presence or absence of a leak in the liquid supply openings 1, 3, and 5, serving as targets (first leak test). For the leaks 100 to 102 in FIG. 4C, the liquid supply opening 1 communicates with the outside via the leak 100, so that the compressed air in the liquid supply opening 1 escapes to the outside (atmosphere), resulting in a reduction in pressure in the liquid supply opening 1. The liquid supply opening 3 communicates with the liquid supply opening 2, which is open to the atmosphere, via the leak 101, so that the compressed air in the liquid supply opening 3 escapes to the atmosphere, resulting in a reduction in pressure in the liquid supply opening 3. In the first leak test, the leaks 100 and 101 can be detected based on such pressure fluctuations. However, leaks existing in the liquid supply openings 2 and 4, which are not connected to the leak testing device 11, for example, the leak 102 located only in the liquid supply opening 4, cannot be detected.

For this reason, after completion of the leak test for the liquid supply openings 1, 3, and 5, the liquid supply openings 2 and 4 are tested for leaks. The leak testing device 11 is connected to the inlet ports 2*a* and 4*a*, and compressed air is supplied to the liquid supply openings 2 and 4. At this time, the liquid supply openings 1, 3, and 5 not to be tested are open to the atmosphere. After supply of the compressed air, a pressure fluctuation in the liquid supply openings 2 and 4 is measured to determine the presence or absence of a leak (second leak test). In the second leak test, the leak 102, which has not been detected in the first leak test, can be detected. All of the liquid supply openings 1 to 5 are tested for leaks in the above-described manner.

If the leak testing device 11 is connected to all of the liquid supply openings 1 to 5 in one test, a leak existing only between the liquid supply openings, such as the leak 101, cannot be detected. The reason is as follows. Since both the liquid supply openings 2 and 3 are connected to the leak testing device 11, compressed air cannot escape to any place, causing no pressure fluctuation in the liquid supply openings 2 and 3. In the above-described method, the liquid supply openings to be tested and the liquid supply openings to be open to the atmosphere need to alternate with each other, and test targets need to be replaced. It is therefore necessary to test the liquid supply openings for leaks two times (multiple times). In other words, all of the liquid supply openings cannot be tested for leaks in one test, leading to a complicated testing procedure.

SUMMARY

In response to the above issue, aspects of the present disclosure provide a liquid ejection board in which all liquid supply openings can be tested for leaks in one test if the spacing between the liquid supply openings is small, and to provide a leak testing method.

The present disclosure provides a liquid ejection head including an ejection-port defining member defining ejection ports through which liquid is ejected and a substrate supporting the ejection-port defining member. The substrate has an array of at least three liquid supply openings through which the liquid is supplied to the ejection ports. The substrate has at least one groove in a region between ends of the liquid supply openings in an extending direction, in which the liquid supply openings extend, and an edge of the substrate that intersects the extending direction. The groove extends from and communicates with the end of at least one of two outermost liquid supply openings of the liquid supply openings. The groove extends at least to a position where the groove is superposed on the liquid supply opening next to the liquid supply opening having the groove in the extending direction.

Further features of the present disclosure will become apparent from the following description of exemplary embodiments with reference to the attached drawings.

DESCRIPTION OF THE EMBODIMENTS

First Embodiment

Figure 1A:
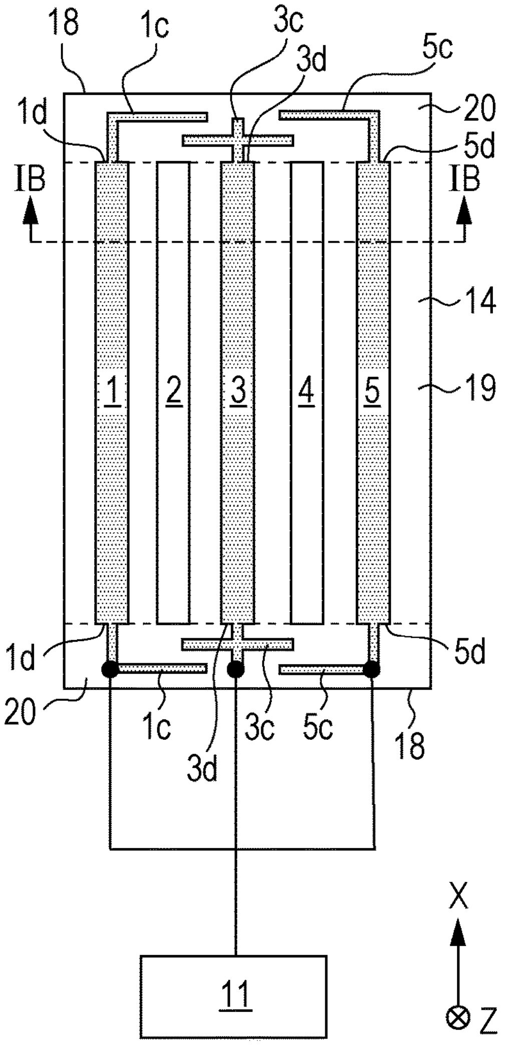
FIGS. 1A to 1C schematically illustrate a liquid ejection board in a first embodiment.
Figure 1C:
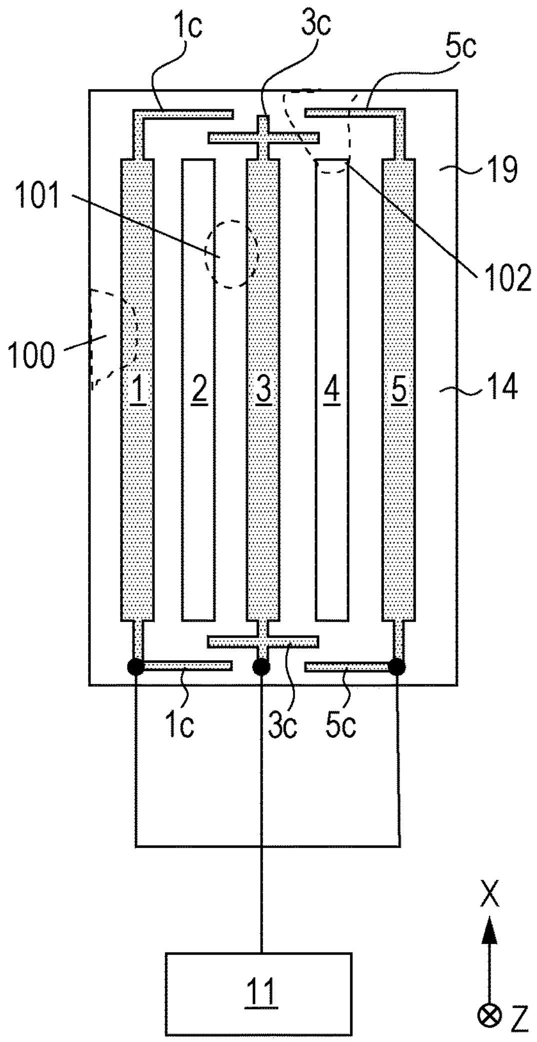
Figure 1B:
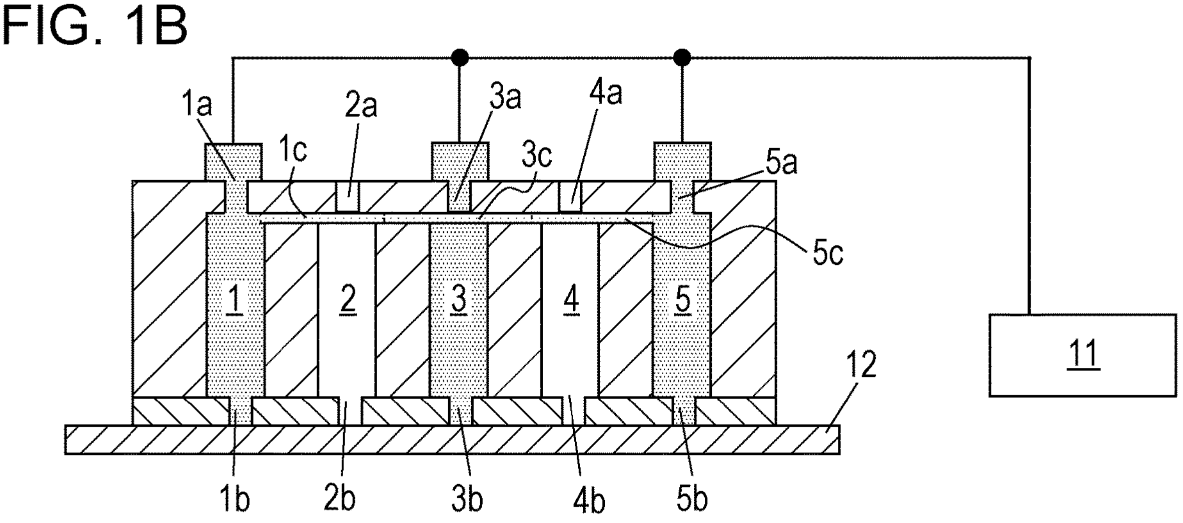

FIG. 1A is a top view of a liquid ejection board 16 in a first embodiment connected to a leak testing device 11. FIG. 1A illustrates the liquid ejection board 16 when viewed in a direction (Z direction) orthogonal to a main surface 19 of a substrate 14. FIG. 1B is a schematic sectional view of the liquid ejection board 16 taken along line IB-IB in FIG. 1A with grooves 1*c*, 3*c*, and 5*c* illustrated in a superposed manner FIG. 1C schematically illustrates leaks 100, 101, and 102 in the top view of FIG. 1A. Descriptions that overlap with those in Comparative Example described with reference to FIGS. 3A to 4C will be omitted.

Liquid supply openings 1 to 5 are arranged in an array direction (orthogonal to the Z direction and an X direction). In this embodiment, the substrate 14 has the grooves 1*c*, 3*c*, and 5*c*, which respectively communicate with the liquid supply openings 1, 3, and 5, to which compressed air is supplied from the leak testing device 11. The grooves 1*c*, 3*c*, and 5*c* are arranged in regions 20, each of which is between ends 1*d*, 3*d*, and 5*d* of the liquid supply openings 1, 3, and 5 in an extending direction (X direction), in which the liquid supply openings extend, and an edge 18 of the substrate 14 that intersects the X direction. Each of the grooves 1*c*, 3*c*, and 5*c* extends at least to a position where the groove is superposed on another liquid supply opening next to the liquid supply opening having the groove in the extending direction of the liquid supply openings 1 to 5. For example, the grooves 1*c* extend to a position where the grooves 1*c* are superposed on the liquid supply opening 2, which is a liquid supply opening next to the liquid supply opening 1 having the grooves 1*c*, in the extending direction.

The leak testing device 11 is connected to the liquid supply openings 1, 3, and 5 via the grooves 1*c*, 3*c*, and 5*c*. The liquid supply openings 2 and 4 are open to atmosphere. The leak testing device 11 supplies compressed air to the liquid supply openings 1, 3, and 5 to measure a pressure fluctuation in the liquid supply openings, thereby testing the liquid supply openings for leaks. For the leaks 101 and 102 at positions illustrated in FIG. 1C, the leak 102 cannot be detected in the first leak test in the above-described method in Comparative Example described with reference to FIGS. 4A to 4C. Therefore, the method in Comparative Example involves the second leak test.

In this embodiment, the grooves 1*c*, 3*c*, and 5*c* are arranged. The grooves 3*c* and 5*c* communicate with the leak 102. Thus, the compressed air in the liquid supply openings 3 and 5 escape to the outside via the leak 102, so that a pressure fluctuation caused by the leak 102 can be detected in one test. According to the present disclosure, leaks existing in all of the liquid supply openings can be detected in one test. Furthermore, it is unnecessary to form a test groove between each liquid supply opening and the next liquid supply opening as described in Japanese Patent Laid-Open No. 2008-74035. The leak test can be appropriately performed if the spacing between the liquid supply openings is small.

To test all of the liquid supply openings in one test, the leak testing device 11 needs to be connected to the liquid supply openings 1 and 5, which are outermost liquid supply openings of the multiple liquid supply openings, in addition to the grooves 1*c*, 3*c*, and 5*c*. If the leak testing device 11 were not connected to the outermost liquid supply openings 1 and 5, leaks existing in the outermost liquid supply openings, such as the leak 100, could fail to be detected. For the other liquid supply openings, it is necessary to alternate a liquid supply opening to be connected to the leak testing device 11 with a liquid supply opening to be open to the atmosphere. The reason is that, if both the liquid supply openings 2 and 3 were connected to the leak testing device 11 or were open to the atmosphere, a leak existing in these liquid supply openings, such as the leak 101, could fail to be detected.

Steps of the above-described leak test can be organized as follows: preparing a substrate having grooves; supplying compressed air to two outermost liquid supply openings of multiple liquid supply openings; causing liquid supply openings that are not supplied with the compressed air to be open to the atmosphere; and measuring a pressure fluctuation in the liquid supply openings supplied with the compressed air.

The grooves 1*c*, 3*c*, and 5*c* can have a depth smaller than the depth of the liquid supply openings 1 to 5 in terms of maintaining the strength of the substrate. Specifically, the depth of the grooves is preferably less than or equal to one tenth of the depth of the liquid supply openings. As used herein, the term "depth" refers to a dimension in the direction (Z direction) orthogonal to the main surface 19 of the substrate 14. Furthermore, the grooves 1*c*, 3*c*, and 5*c* can have a width smaller than the width of the liquid supply openings 1 to 5 from the viewpoint of the strength of the substrate. Specifically, the width of the grooves is preferably less than or equal to one half of the width of the liquid supply openings. As used herein, the term "width of the grooves 1*c*, 3*c*, and 5*c*" refers to a dimension of the grooves in a direction orthogonal to a longitudinal direction of the grooves 1*c*, 3*c*, and 5*c*. In addition, the term "width of the liquid supply opening" refers to a dimension of the liquid supply opening in a direction orthogonal to a longitudinal direction of the liquid supply opening.

In the leak test, a gas, such as helium or argon, can be used instead of compressed air. Liquid, such as ink, may be supplied to the liquid supply openings having the grooves. Whether the ink is detected in a liquid supply opening having no grooves may be determined, thereby determining the presence or absence of a leak.

In other words, as long as a high-pressure fluid can be supplied to the liquid supply openings, the fluid may have any form.

In a case where only two liquid supply openings are arranged, all of the two liquid supply openings cannot be tested for leaks in one test. The reason is as follows. If compressed air is supplied only to one of the two liquid supply openings, a leak existing only in the other liquid supply opening cannot be detected. If compressed air is supplied to both the liquid supply openings, a leak existing only between the two liquid supply openings cannot be detected. Therefore, the leak testing method in the present disclosure can be used for a substrate having at least three liquid supply openings.

Second Embodiment

Figure 2A:
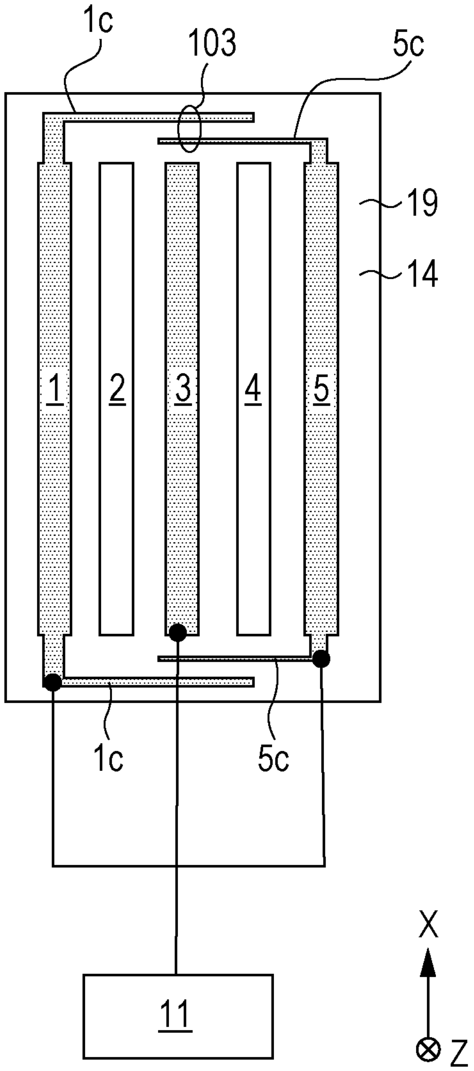
FIGS. 2A and 2B are top views of liquid ejection boards in a second embodiment.
Figure 2B:
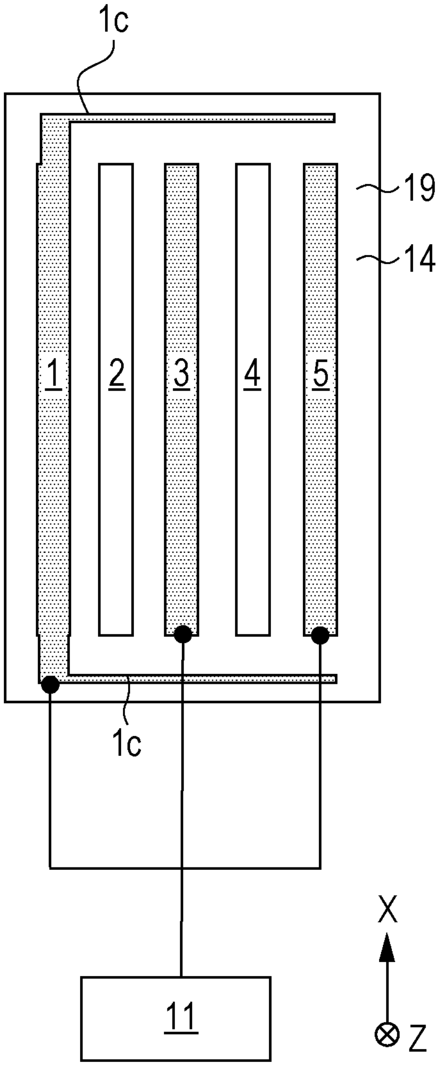
Figure 3A:
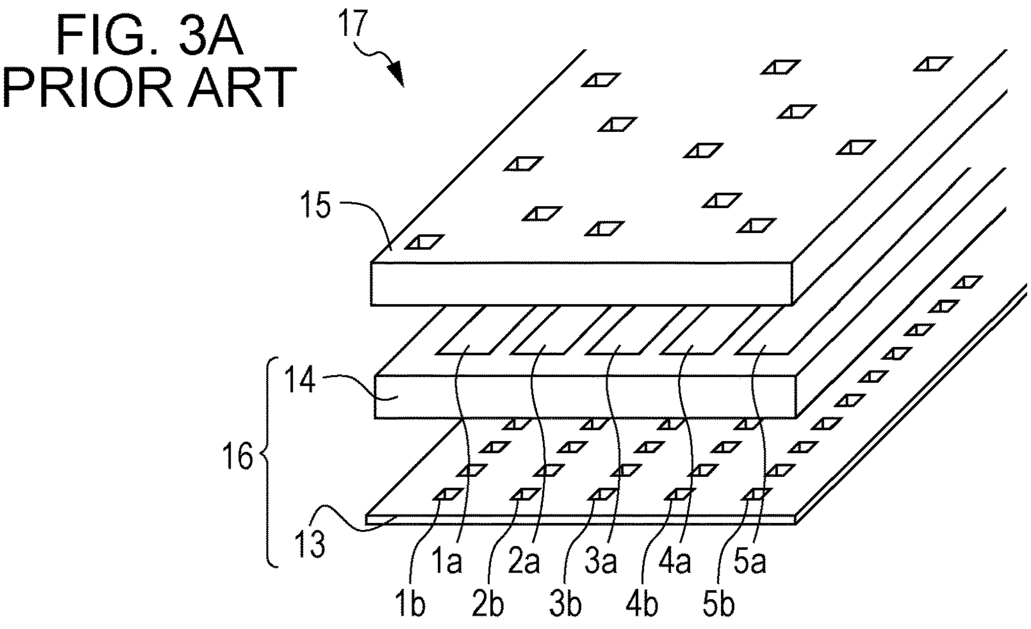
FIG. 3A PRIOR ART
FIGS. 3A to 3C schematically illustrate a liquid ejection board in Comparative Example.
Figure 3B:
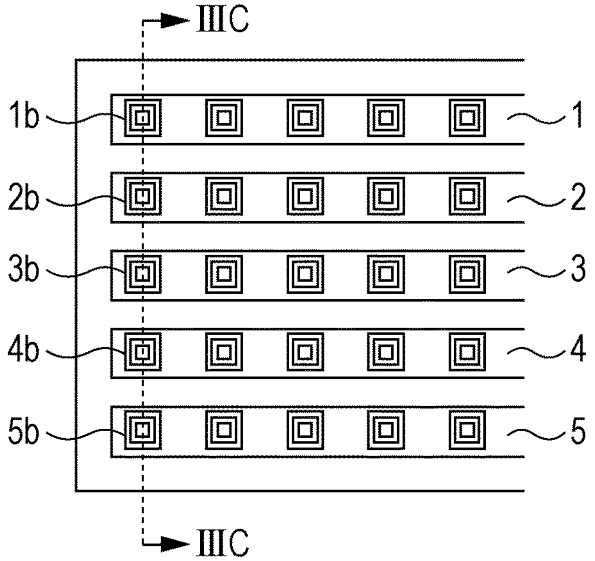
FIG. 3B PRIOR ART
Figure 3C:
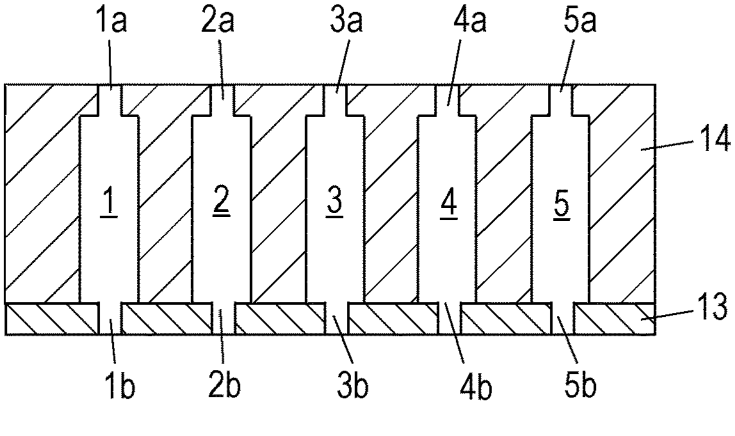
FIG. 3C PRIOR ART
Figure 4A:
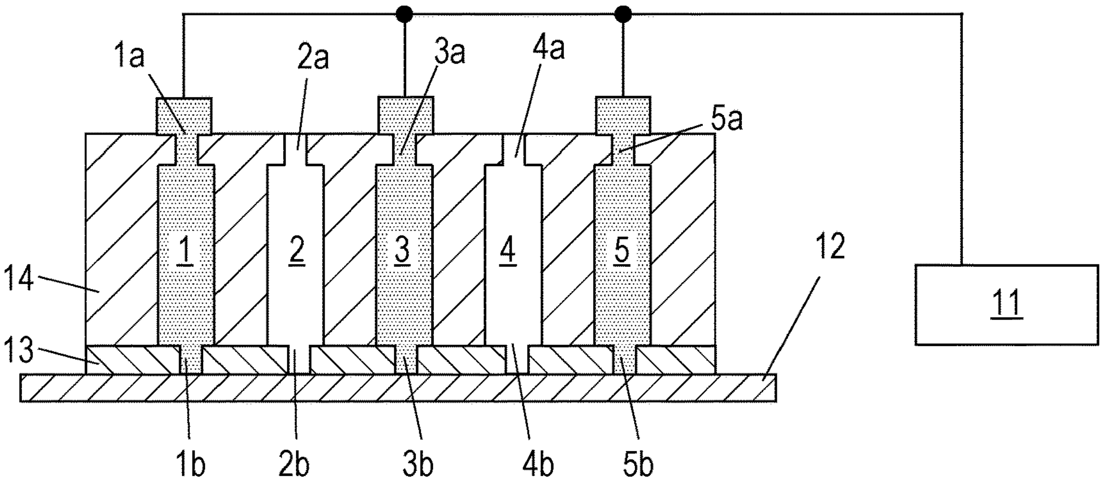
FIG. 4A PRIOR ART
FIGS. 4A to 4C schematically illustrate leak testing in Comparative Example.
Figure 4B:
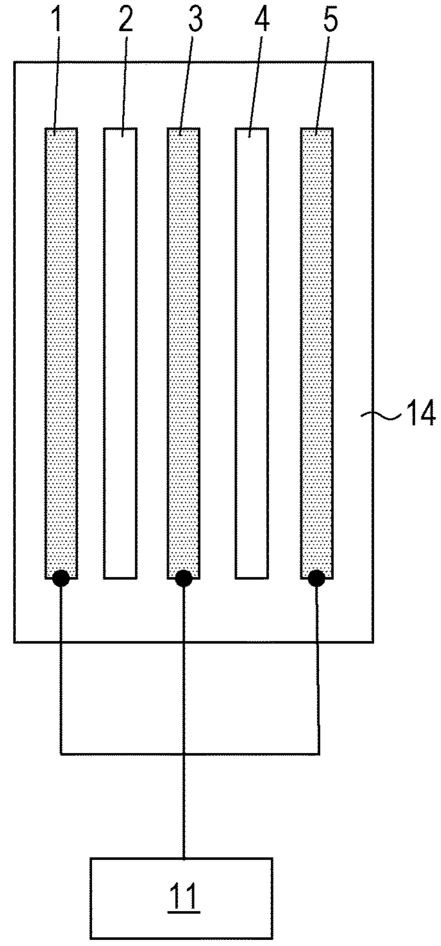
FIG. 4B PRIOR ART
Figure 4C:
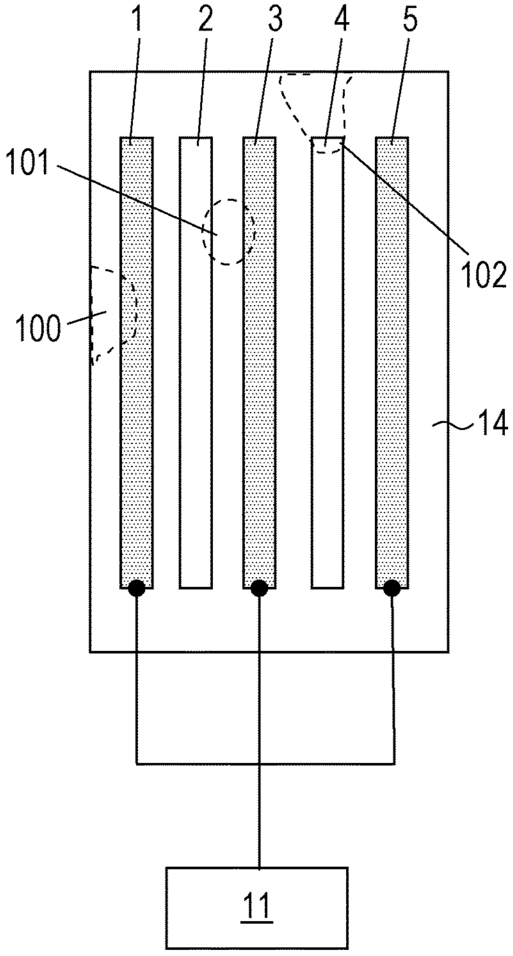
FIG. 4C PRIOR ART

A second embodiment will be described with reference to FIGS. 2A and 2B. The same element as that in the first embodiment is assigned the same reference sign, and a description thereof is omitted. FIG. 2A is a top view of the substrate 14 in the second embodiment. FIG. 2B is a top view of a modification of the substrate 14 in the second embodiment.

In the first embodiment, the three liquid supply openings 1, 3, and 5 have the grooves 1*c*, 3*c*, and 5*c*, respectively. Referring to FIG. 2A, the liquid supply openings 1 and 5, serving as outermost liquid supply openings, have the grooves 1*c* and 5*c*, respectively. The liquid supply opening 3 has no grooves 3*c*. Instead, the grooves 1*c* and 5*c* each extend to a position where the groove is superposed on the liquid supply opening 3 in the X direction. In this arrangement, a leak 103 existing only in the liquid supply opening 3 can be detected based on a pressure fluctuation caused by communication between the leak 103 and at least one of the grooves 1*c* and 3*c*. Thus, all of the liquid supply openings can be tested for leaks in one test, as in the first embodiment. As illustrated in FIG. 2A, the two liquid supply openings need to have grooves. The number of grooves arranged in the second embodiment is less than that in the first embodiment. This facilitates production of the substrate 14.

Referring to FIG. 2B, the substrate 14 has only the grooves 1*c*. Each of the grooves 1*c* extends to a position where the groove is superposed on the liquid supply opening 5 in the X direction. Specifically, the grooves 1*c* extending from only one outermost liquid supply opening of the multiple liquid supply openings need to be superposed on the other outermost liquid supply opening in the X direction. A reduction in the number of grooves to be arranged further facilitates production of the substrate 14.

The present disclosure provides a liquid ejection board in which all liquid supply openings can be tested for leaks in one test if the spacing between the liquid supply openings is small and provides a leak testing method.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2021-076731 filed Apr. 28, 2021, which is hereby incorporated by reference herein in its entirety.

What is claimed is:

1. A liquid ejection head comprising:

an ejection-port defining member defining ejection ports through which liquid is ejected in an ejection direction; and a substrate supporting the ejection-port defining member, the substrate having at least three liquid supply openings through which the liquid is supplied to the ejection ports, the liquid supply openings being arranged in an array direction and extending in an extending direction orthogonal to the array direction, when viewed in the ejection direction, wherein at least one groove is disposed in a region of the substrate between ends of the liquid supply openings in the extending direction, and an edge of the substrate that intersects the extending direction when viewed in the ejection direction, wherein the at least one groove extends from and is open to the end of at least one of two outermost liquid supply openings of the liquid supply openings in the array direction, and is disposed closer to a main surface of the substrate than a surface of the substrate supporting the ejection port defining member, and wherein the at least one groove includes a portion which extends in the array direction at least to a position where, when viewed in the extending direction, the portion of the groove is superposed on the liquid supply opening next to the liquid supply opening from which the groove extends.

2. The liquid ejection head according to claim 1, wherein the at least one groove comprises a plurality of grooves extending from the two outermost liquid supply openings of the liquid supply openings.

3. The liquid ejection head according to claim 1, wherein the at least one groove extends only from one outermost liquid supply opening of the liquid supply openings to a position where the groove is superposed on the other outermost liquid supply opening in the extending direction.

4. The liquid ejection head according to claim 1, wherein a depth of the at least one groove is smaller than a depth of the liquid supply openings.

5. The liquid ejection head according to claim 4, wherein the depth of the at least one groove is less than or equal to one tenth of the depth of the liquid supply openings.

6. The liquid ejection head according to claim 1, wherein another portion of the at least one groove, which extends in the extending direction, has a width in a direction orthogonal to a longitudinal direction of the another portion, the liquid supply openings have a width in a direction orthogonal to a longitudinal direction of the liquid supply openings, and the width of the groove another portion is smaller than the width of the liquid supply openings.

7. The liquid ejection head according to claim 6, wherein the width of the another portion of the groove is less than or equal to one half of the width of the liquid supply openings.

* * * * *